United States Patent
D'Andrea

[19]

[11] Patent Number: 6,135,844
[45] Date of Patent: Oct. 24, 2000

[54] ILLUSTRATED BOOK WITH TRANSFERABLE EDIBLE ITEM FEATURE

[76] Inventor: Deborah D'Andrea, 655 W. Market St., Akron, Ohio 44303

[21] Appl. No.: 09/107,614

[22] Filed: Jun. 30, 1998

Related U.S. Application Data

[60] Provisional application No. 60/051,394, Jul. 1, 1997.

[51] Int. Cl.$^7$ .......................... G09B 17/00; A63H 33/38; B42D 1/00
[52] U.S. Cl. ........................ 446/75; 434/178; 281/15.1
[58] Field of Search .......................... 434/178; 446/147, 446/149, 151, 75; 281/15.1, 29, 37

[56] References Cited

U.S. PATENT DOCUMENTS

| | | | |
|---|---|---|---|
| 1,011,833 | 12/1911 | Newell | 83/63.1 |
| 1,028,921 | 6/1912 | Wagner . | |
| 1,033,576 | 7/1912 | Garman . | |
| 1,168,392 | 1/1916 | Gruettner . | |
| 2,147,135 | 2/1939 | Addis et al. . | |
| 2,303,070 | 11/1942 | Addis et al. . | |
| 2,489,240 | 11/1949 | Meyer . | |
| 2,538,085 | 1/1951 | Cotton | 434/178 |
| 3,191,184 | 6/1965 | Durstewitz . | |
| 3,256,634 | 6/1966 | Mace . | |
| 3,622,771 | 11/1971 | Franc . | |
| 3,715,816 | 2/1973 | White . | |
| 3,918,180 | 11/1975 | Chamberlin | 434/178 |
| 4,176,473 | 12/1979 | Rae . | |
| 4,496,510 | 1/1985 | Hanson et al. | 264/176 |
| 4,642,054 | 2/1987 | Wada | 434/178 |
| 4,696,473 | 9/1987 | Wyzkowski . | |
| 4,702,700 | 10/1987 | Taylor . | |
| 4,900,062 | 2/1990 | Maggi . | |
| 4,931,017 | 6/1990 | Mann | 434/87 |
| 4,948,146 | 8/1990 | Snyder et al. . | |
| 4,986,757 | 1/1991 | Mueller . | |
| 4,988,110 | 1/1991 | Zuckerman et al. . | |
| 5,031,935 | 7/1991 | D'Andrea . | |
| 5,049,078 | 9/1991 | Thomsen . | |
| 5,213,214 | 5/1993 | Stringham . | |
| 5,238,345 | 8/1993 | D'Andrea . | |
| 5,447,584 | 9/1995 | Shakespeare et al. . | |
| 5,449,179 | 9/1995 | Hefferan . | |
| 5,464,253 | 11/1995 | Farrell . | |
| 5,478,120 | 12/1995 | D'Andrea . | |
| 5,545,069 | 8/1996 | Glynn et al. . | |
| 5,573,438 | 11/1996 | D'Andrea . | |
| 5,913,541 | 6/1999 | Chen | 281/37 |

FOREIGN PATENT DOCUMENTS

| | | |
|---|---|---|
| 705459 | 3/1954 | United Kingdom . |

*Primary Examiner*—Paul J. Hirsch
*Assistant Examiner*—Michael B. Priddy
*Attorney, Agent, or Firm*—Oldham & Oldham Co., L.P.A.

[57] ABSTRACT

A children's activity book is disclosed comprising illustrated pages having openings thereon for the placement of edible candy. When the page is turned the edible candy passes through the opening and is deposited onto and completes an illustration on a subsequent page. In an alternative embodiment of the present invention, edible candy is placed into a portal at one position of an illustrated page and passed through a passageway before exiting from an outlet at a second position of the illustration. The book is designed to encourage reading by making it more enjoyable. The book has the added feature of teaching young readers about change observed through the transformation of candy from one meaning on a first page to a second meaning on a subsequent page.

14 Claims, 3 Drawing Sheets

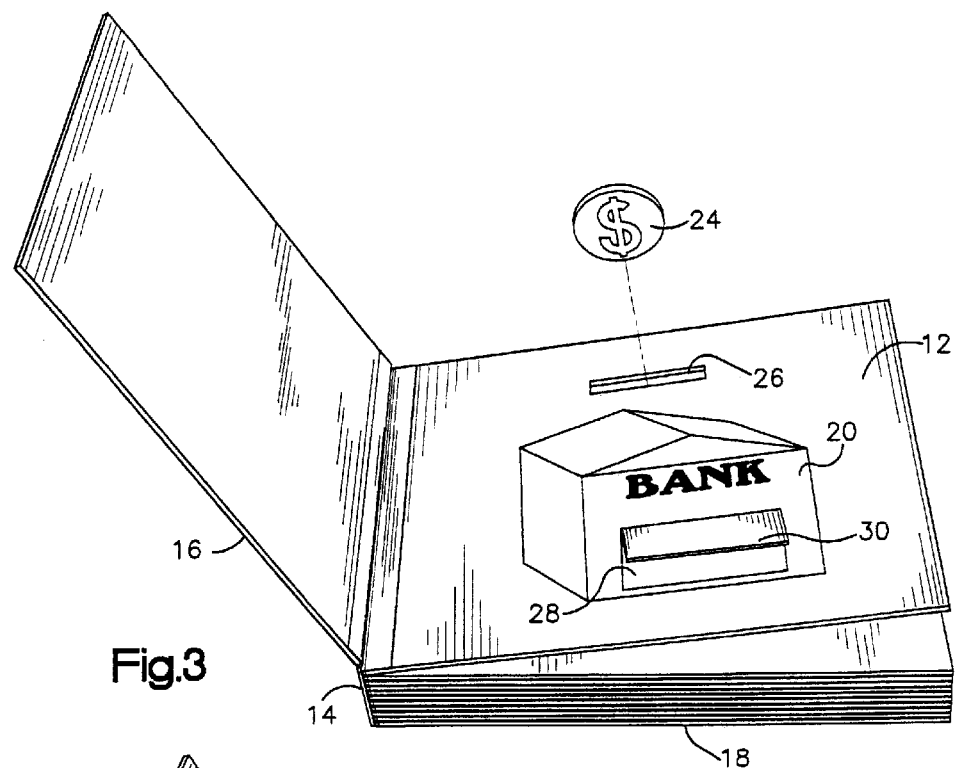
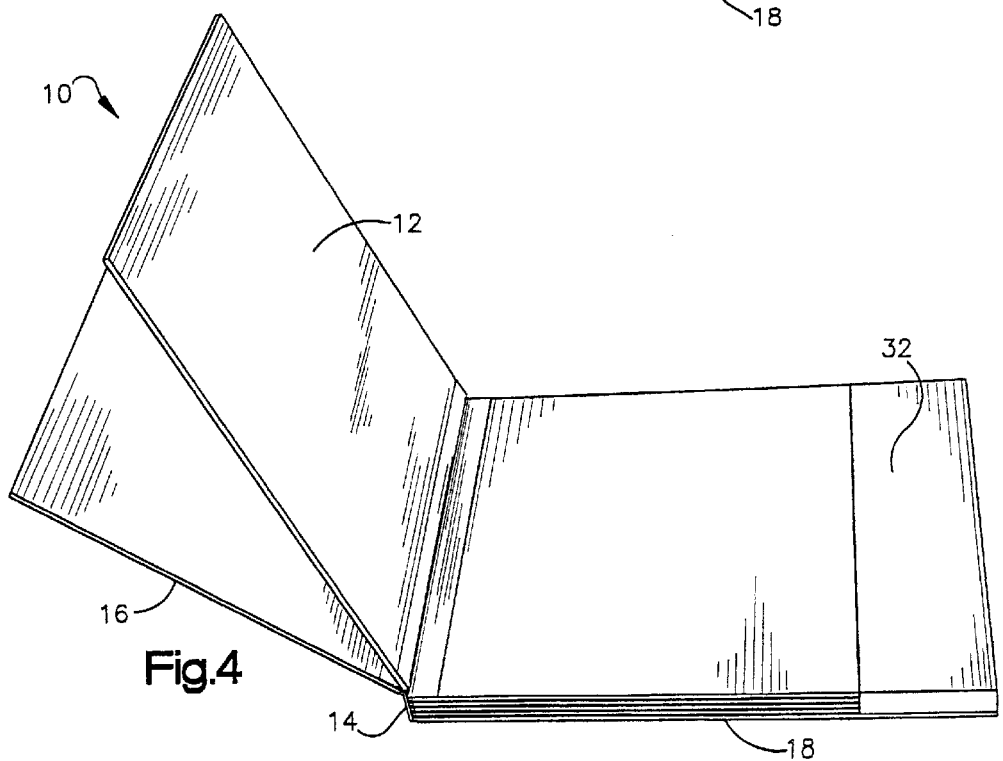

ILLUSTRATED BOOK WITH TRANSFERABLE EDIBLE ITEM FEATURE

Applicant claims priority from U.S. Provisional Application Serial No. 60/051,394 filed on Jul. 1, 1997.

FIELD OF INVENTION

The present invention relates to a book for young readers designed to make reading more enjoyable. The book of the present invention preferably includes illustrations on at least some of the pages. The present invention is directed to the completion of such illustrations with edible candy and more particularly to the transferring of edible candy from one position on an illustration to another position on the same or a subsequent illustration. The illustrated pages include at least one hole thereion, in which edible candy may be placed to complete the illustration. When the page is turned, the candy is allowed to pass through the hole in the page and occupy a position to complete an illustration on a subsequent page. Alternatively, candy may be placed in a hole or slot to complete an illustration and thereafter transferred through or behind the page so that it appears at a different position completing the illustration on the same page. The transfer of candy from one illustration to another, or from one position on an illustration to another, allows the child to interact with the book and thereby captures the child's attention and promotes reading.

BACKGROUND OF THE INVENTION

Encouraging children to read has always been a concern of society. As school and work become increasingly competitive, the importance of encouraging children to read at a young age has increased.

Many different types of books have been designed to make reading more enjoyable for young readers. For example, there are books that allow the reader to see his or her image superimposed on the pages thereof. Other books are designed to play music or make animal sounds. Activity books are also known which encourage children to read by allowing them to interact with the book in a way that relates to the theme or plot of the book. However, parents and educators are continuously looking for new ways to encourage young readers.

Children's books have traditionally focussed on educating the young reader. Typically children's books have drawn on the basic themes relating to teaching fundamental skills such as counting and shape or size recognition. Few books provide the child with the opportunity to develop skills related to the transformation or evolution of objects. Children can learn the fundamentals of dynamics by observing an illustration undergo a change. A piece of candy, representing a feature of an illustration on one page and appearing to undergo a change as it passes through the page such that it represents a different feature on a subsequent page, may also be used to develop skills related to change or dynamics. Currently available children's activity books do not offer the young reader a vehicle for developing skills related to change and evolution or which otherwise allow the young reader to observe dynamics.

SUMMARY OF THE INVENTION

The present invention is therefore directed to a book designed to make reading more enjoyable for young readers comprising at least one illustrated page and at least one hole or opening on the page in which a piece of edible candy is placed to complete the illustration or supplement the theme of the book. The location of the hole on the page is such that when the page is turned the candy is allowed to pass through the page and is transferred to a hole or position on a subsequent page so that it may complete an illustration thereon. In this preferred embodiment, the pieces of candy constituting part of the subject of one illustration are transformed into part of the subsequent illustration on the next page. In this way, the candy is used to show change, evolution or some other dynamic process.

In an alternative embodiment, one or more two-ply illustrated pages of the book include at least one hole or slit through which candy is allowed to pass so that it may emerge through a second hole or slit on the same illustrated page. The reader's interaction with the book in this embodiment includes placing the candy through a hole in accordance with the theme of the book and observing the movement of the candy from one position to another thereby transforming its initial meaning or state into something else. In this way, the candy may appear to traverse the page as if conveyed by an illustrated vehicle or character; alternatively the candy itself may be the character.

The above and other embodiments, features and advantages of the present invention will become apparent from the following description read in conjunction with the accompanying drawings, in which like reference numerals designate the same elements.

BRIEF DESCRIPTION OF THE DRAWINGS

FIG. 3 illustrates an alternative embodiment of the present invention;

FIG. 4 shows a book in accordance with the present invention packaged together with a receptacle or cartridge containing the candy.

DETAILED DESCRIPTION OF THE INVENTION

Figure 1:
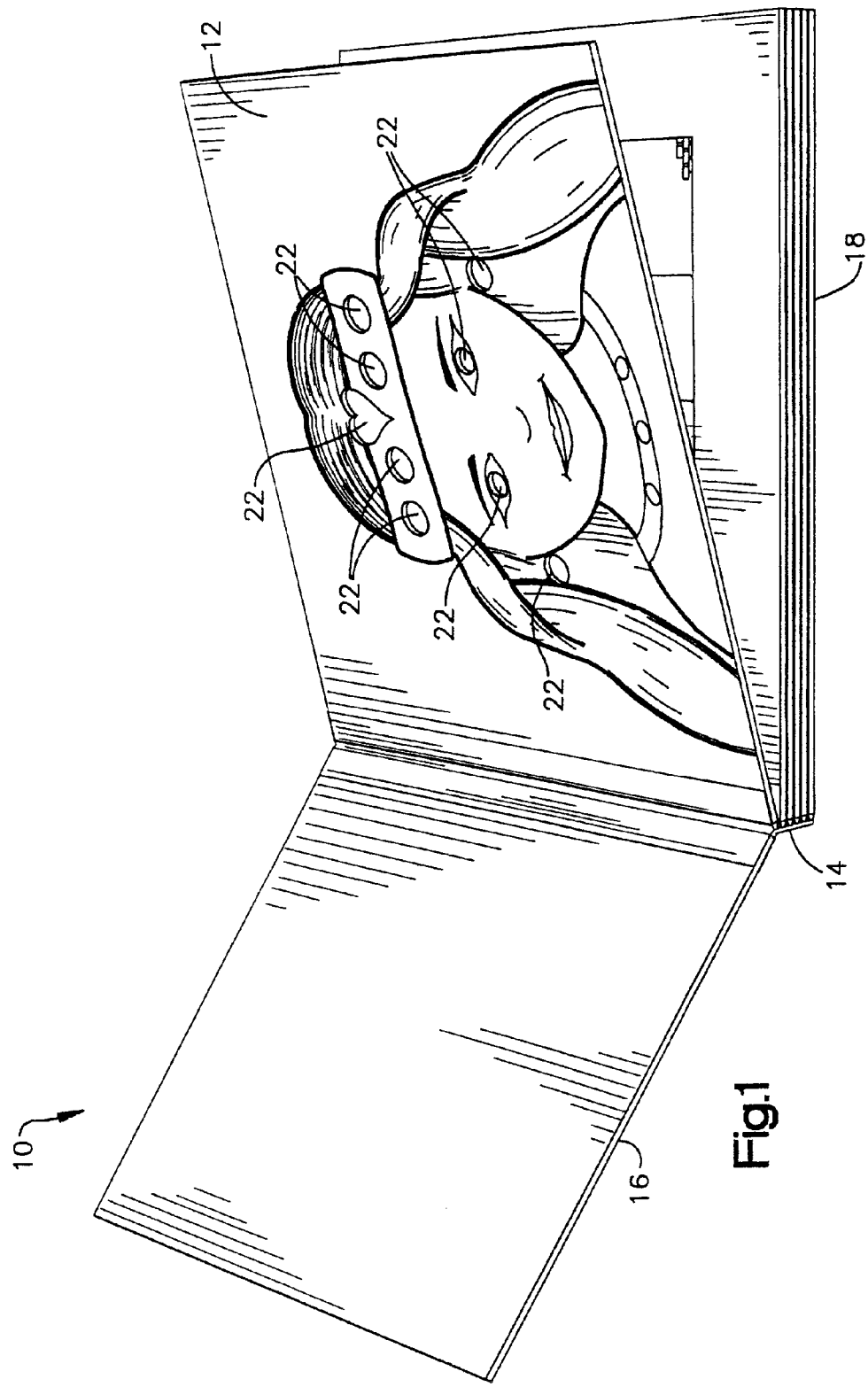
FIG. 1 pictorially illustrates a book in accordance with the present invention.
Figure 2:
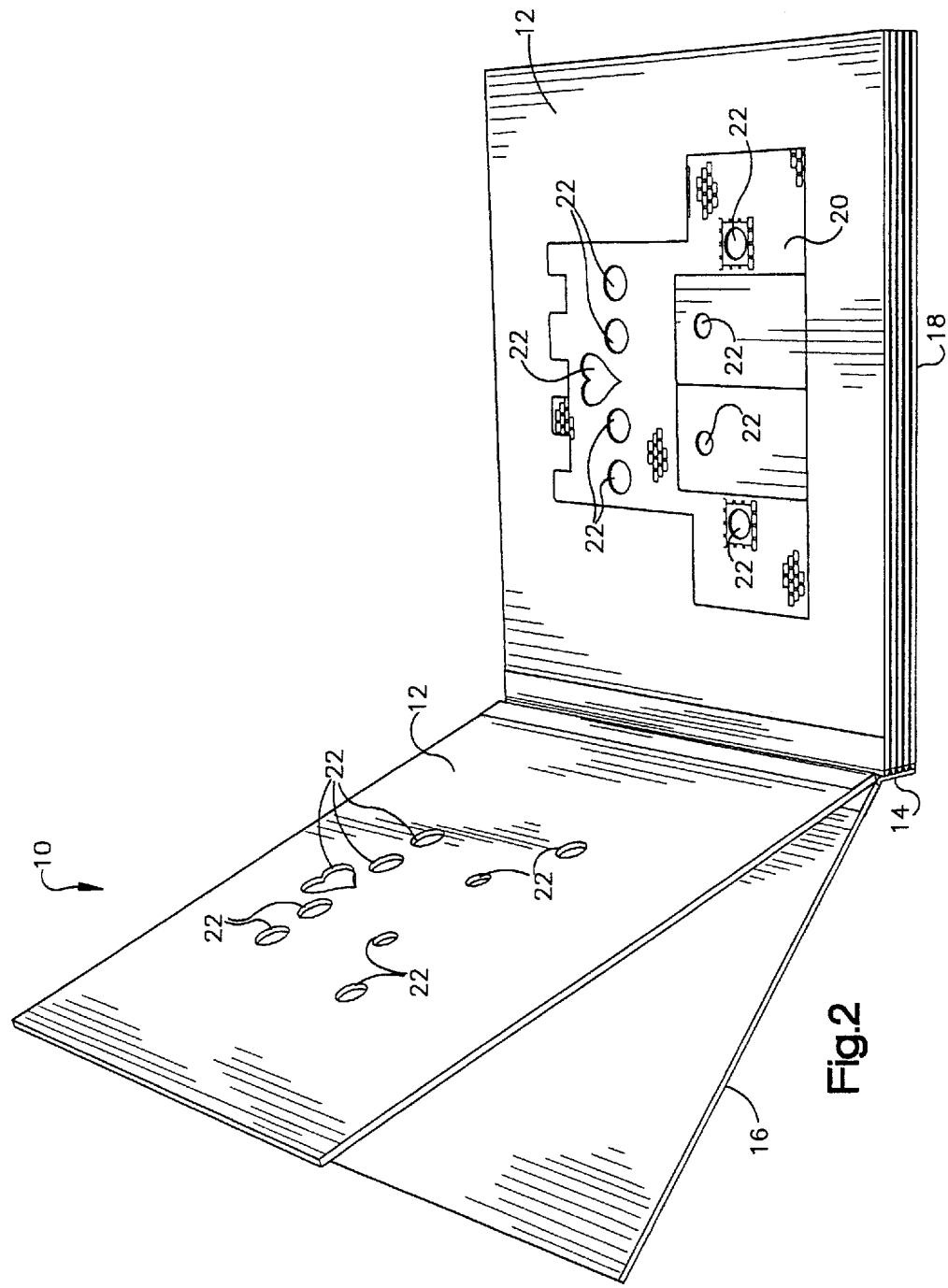
FIG. 2 is a view of the book of FIG. 1 showing the holes or openings of a previous page as it is turned and the holes of the subsequent page completing a different illustration.

A book in accordance with the present invention is shown generally at 10 in FIGS. 1 and 2 and comprises one or more pages 12 bound together in book form by a binding 14. Binding 14 may be formed in any suitable manner known in the book binding art. For example, a spiral wire binding or an adhesive may be used to bond the various pages 12 of book 10 together. Book 10 is contemplated for use by children and as such, may be manufactured to withstand some amount of mistreatment. For example, pages 12 of book 10 may be formed from relatively heavy paper stock or hard plastic so that the pages 12 will resist tearing. Also, a front cover 16 and a rear cover 18 are preferably provided to protect the pages 12 of book 10.

A preferred embodiment of the book 10 of the present invention is shown in FIGS. 1 and 2 wherein at least one of the pages 12 of book 10, and preferably a plurality of pages 12 include an illustration 20 printed, painted, or otherwise disposed on at least a portion thereof. Any illustration 20 may be utilized and the invention is not meant to be limited to the examples shown in the figures. The illustration 20 as it appears on page 12 is incomplete in that at least one feature of the illustration 20 coincides with a hole or opening 22 in the page 12. The hole or opening 22 is shaped so as to compliment the illustration 20 such that the reader may complete the illustration 20 by placing a piece of edible candy 24 into the hole or opening 22. The theme of the book may direct the reader to insert a piece of candy 24 into a specific hole or opening 22 or, alternatively, the reader may choose the hole or opening 22 to be filled. Preferably, the candy 24 is shaped to match the shape of the hole or opening 22. As an example, the heart-shaped opening in the crown of FIGS. 1 and 2 would preferable be filled with a heart-shaped candy.

As the pages 12 of book 10 are turned, the candy 24 placed in the holes or openings 22 is allowed to pass through the page 12 and onto the following page. The illustration on the following page may have corresponding holes or openings 22 as shown in FIG. 2 so that the candy 24 will occupy the corresponding holes or openings 22, or alternatively the candy 24 will be deposited directly onto the following page without occupying a hole or opening 22. The illustration 20 on the following page may or may not be identical to that of the preceding page. When the illustrations 20 are not identical, the same piece of candy 24 will complete two different illustrations 20 as in FIG. 2 so that it will appear to the reader as if the candy 24 has undergone a transformation or other dynamic according to the theme of the book.

Additional holes or openings 22 may be included with each subsequent page 12 so that the reader may be instructed to continue the placement of candy 24 as the book is read. Alternatively, the child reader may be instructed to remove candy from an illustration after turning the page. The theme of the book 10 may also instruct the reader to eat some or all of the candy 24 placed into the holes or openings 22 as is consistent with the overall goal of encouraging reading by making the experience more enjoyable. The reader may be instructed to eat the candy at the end of the book or once candy has passed between illustrations as is consistent with the theme of the book. The book is particularly suitable for use with candy such as jelly beans, mints or other candy easily placed into and readily traversed through the holes or openings 22. The invention is not limited to any particular type or shape of candy 24, the only requirement being the ability of the candy to traverse the holes or openings 22 so that it may be transferred for completion of a subsequent illustration 20.

One particular variation to this embodiment of the invention involves the use of gummi or jelly-like candy in elongated shapes such as worms, fingers or hair. According to this embodiment, the elongated candy is threaded through the holes or openings of the book. As the pages are turned, the illustration completed by the candy change. For example, a worm appearing on one page to protrude from an apple may after turning to the next page appear on the end of a fishing hook.

An alternative embodiment 10' of the present invention is shown in FIG. 3. The book 10' is constructed as a conventional book with at least one page 12, a binding 14, a front cover 16, and a back cover 18. The book is further characterized by having an illustration 20 on at least one page 12. The illustration 20 includes a entrance slot or portal 26 for the introduction of edible candy 24. The page 12 of book 10' is constructed such that the candy 24 may pass behind the page so that it is transferred from the entrance slot or portal 26 to an outlet 28 where the reader may retrieve it in accordance with the theme or plot of the book. A book constructed according to this embodiment preferably includes a backing sheet (not shown) connected to page 12 in such a manner as to form a pocket or passageway between page 12 and the backing sheet. It is also contemplated that the backing sheet may be an adjacent page of the book. Preferably, the outlet 28 includes a flap 30 which the reader must lift in order to retrieve the candy 24.

The candy 24 used with book 10' is preferably wafer or disk-shaped such as chocolate or bubble gum coins, although any candy capable of traversing the space behind page 12 may be used. The theme of the book may require the reader to hide or save items by placing them into the entrance slot or portal 26. Alternatively, the illustration 20 may undergo a transformation from its initial state with the candy 24 at the entrance slot or portal 26 to a final state with the candy at the outlet 28. Of course, the reader may be instructed to eat some or all of the candy 24 consistent with the overall objective of encouraging reading by making the experience more enjoyable.

Candy 24 accompanying book 10 is preferably packaged along with the book as shown in FIG. 4. Accordingly, book 10 includes an attached candy receptacle or cartridge 32 which may accompany book 10 as part of the packaging or may be appended to back cover 18. The invention is not intended to be limited to attachment of the candy receptacle or cartridge in any particular location of the book 10, nor is it intended to be limited to any particular means of attachment or packaging. Alternatively, the candy 24 may be packaged separately as replacement or substitute candy.

What is claimed is:

1. An activity book, comprising:
   a front cover, a back cover, a binding and a set of bound pages;
   at least one page of said set having an illustration thereon and an opening corresponding to a feature of said illustration;
   at least one following page adjacent said at least one page, said at least one following page having an illustration thereon; wherein
   an edible item placed in said opening forms part of said illustration on said at least one page and is transferred to and forms part of said illustration on said at least one following page when said at least one page is turned.

2. An activity book as recited in claim 1, wherein said at least one following page further comprises an opening corresponding to a feature of said illustration thereon, said opening in said at least one following page receiving said edible item when said at least one page is turned.

3. An activity book as recited in claim 2, wherein said edible item is elongated and is threaded through said opening in said at least one page and through said opening in said at least one following page.

4. An activity book as recited in claim 1, wherein said set of bound pages is made from a material selected from the group consisting of: heavy paper stock and plastic.

5. An activity book as recited in claim 1, wherein said edible item is a member selected from the group consisting of: jelly beans, mints, heart-shaped candy, gummy candy, wafers, candy coins and character-shaped candy.

6. An activity book as recited in claim 1, further comprising an edible item receptacle appended to said activity book.

7. An activity book as recited in claim 1, wherein said opening and said edible item have the same shape.

8. An activity book as recited in claim 6, wherein said edible item receptacle is a candy cartridge.

9. An activity book as recited in claim 6, wherein said receptacle is removably attached to said activity book.

10. An activity book, comprising:
    a set of bound pages;

at least one page of said set having an illustration thereon, said at least one illustrated page
including a portal for the introduction of an edible item and an outlet for the retrieval of said edible item;
a backing sheet connected to said at least one illustrated page forming a passageway between said portal and said outlet.

11. An activity book as recited in claim 10, wherein said at least one illustrated page further comprises a flap over said outlet.

12. A method of forming part of an illustration on a page of a book comprising the steps of:
   (a) placing an edible item in an opening on a first page of said book; and
   (b) turning said first page of said book so as to transfer said edible item through said opening and deposit said edible item onto a second illustrated page of said book, said edible item thereby forming part of said illustration on said second page of said book.

13. A method of forming part of an illustration on a page of a book as recited in claim 12, wherein said edible item is deposited in an opening on said second page of said book and transferred through said opening in said second page of said book to a third illustrated page of said book when said second page of said book is turned, thereby forming part of an illustration on said third page of said book.

14. A method of forming part of illustrations on a page of a book comprising the steps of:
   (a) providing an activity book comprised of a set of bound pages, at least one page of said set having at least two illustrations thereon; said at least one illustrated page including a portal for the introduction of an edible item, said portal forming part of a first illustration and an outlet for the retrieval of said edible item, said outlet forming part of a second illustration; and a backing sheet connected to said at least one illustrated page forming a passageway between said portal and said outlet;
   (b) placing an edible item in said portal such that said edible item forms part of said first illustration; and
   (c) moving said edible item through said passageway to said outlet such that said edible item forms part of said second illustration.

* * * * *